United States Patent [19]

Brouard et al.

[11] 4,244,046

[45] Jan. 6, 1981

[54] DIGITAL DATA TRANSMISSION SYSTEM PROVIDING MULTIPOINT COMMUNICATIONS

[75] Inventors: Germain G. Brouard, Dourdan; Claude A. Molleron, Fontenay-aux-Roses, both of France

[73] Assignee: Societe Anonyme de Telecommunications, Paris, France

[21] Appl. No.: 9,668

[22] Filed: Feb. 5, 1979

[30] Foreign Application Priority Data

Feb. 7, 1978 [FR] France .................................. 78-03391

[51] Int. Cl.³ .......................................... H04Q 11/04
[52] U.S. Cl. ................................. 370/62; 179/18 BC; 370/84
[58] Field of Search ........ 179/15 AT, 15 AQ, 15 BV, 179/181 L, 18 BC, 1 CN; 370/84, 62, 66

[56] References Cited

U.S. PATENT DOCUMENTS

| | | | |
|---|---|---|---|
| 3,952,162 | 4/1976 | Texier | 179/15 BV |
| 3,987,251 | 10/1976 | Texier | 179/15 BV |
| 4,160,128 | 7/1979 | Texier | 179/15 BV |
| 4,168,401 | 9/1979 | Molleron | 179/15 BV |

*Primary Examiner*—David L. Stewart
*Attorney, Agent, or Firm*—Abraham A. Saffitz

[57] ABSTRACT

A multipoint communication digital transmission system in which the main data transceiver of each multipoint communication can communicate simultaneously with a plurality of secondary transceivers and they can each, in turn, communicate with the main data transceiver. First, second and third multiplexer means are provided, each at its own characteristic sampling rate. Selective switching is provided. Corresponding first, second and third multiplexing means are also provided.

6 Claims, 3 Drawing Figures

DIGITAL DATA TRANSMISSION SYSTEM PROVIDING MULTIPOINT COMMUNICATIONS

CROSS REFERENCES TO RELATED APPLICATIONS

Applicants hereby make cross references to their French Patent Application PV 78 03391, filed Feb. 7, 1978 and claim priority thereunder following the provisions of 35 U.S.C. 119.

BACKGROUND OF THE INVENTION

1. Field of the Invention

The invention relates to a digital data transmission system providing multipoint communications. Each multipoint communication is effected between a main data transceiver and a plurality of secondary data transceivers. The secondary data transceiver each, in turn, communicate with the main transceiver.

The multipoint communications and the data transceivers used in the present invention are defined in "Recommendation X50" of the International Telegraph and Telephone Consultative Committee (C.C.I.T.T.), Fifth Plenary Assembly, Geneva, December 1972, Green Book, volume VIII, Data Transmission, Published by the International Telecommunications Union, pages 201 through 203.

For a multipoint communication, a plurality of data transceivers which are the so called "data terminal equipment" (D.T.E.) are connected therebetween through the digital links of a digital switching network which have the same digital rate. This plurality of data transceivers comprises a data transceiver called a "main data transceiver", while the other data transceivers are each called a "secondary data transceiver". The main transceiver transmits main data which are delivered to all of the secondary transceivers.

The main transceiver examines in turn, each of the secondary transceivers in accordance with the data transmission method which varies in accordance with the type of the digital network. Consequently, all of the data transmitted from the main transceiver are received in the secondary transceivers. In reverse, the data transmitting means of the one of secondary transceivers is operated only at a predetermined instant in time so that the data transmitting means transmits data to the main transceiver. In other words, each of the secondary transceivers transmits, in turn, only one at a time the data to the main transceiver. These data transfers are effected by means of a multipoint junction unit and the various switching operations between the first order or low rate digital links which convey the multiplexed main and secondary data are accomplished by means of the digital switching unit of a digital frame.

2. Description of the Prior Art

A multipoint digital data transmission system is described, for example, in French Patent No. 2,346,915, filed on Mar. 31, 1976. The French Pat. No. 2,346,915 issued on Sept. 11, 1978. In this system, the component transceiver data are transmitted in the form of recurrent octets on bidirectional digital transmission links having first low rates which are different from but multiples of one another. The low rate links undergo a first time-division multiplexing by means of first multiplexer and demultiplexer units into second order bidirectional digital transmission links having a second rate.

To give an idea of the rates, the first binary rates, for example, are 12.8, 6.4, 3.2 and 0.8 kbit/s and the second binary rate is 64 kbit/s. A 64 kbit/s link may be derived from the time-division multiplexing of a component links at 12.8 kbit/s, b component links at 6.4 kbit/s, c component links at 3.2 kbit/s and d component links at 0.8 kbit/s in accordance with the following relation:

$$16a + 8b + 4c + d = 80$$

80 being the number of octets in the recurrent frame of a 64 kbit/s rate link. Thus, the octets belonging at these low rate lines are repeated every fifth octet, every tenth octet, every twentieth and every eightieth octet on the 64 kbit/s frame, respectively.

In accordance with the aforementioned French Patent Application, a multipoint junction unit is connected to the digital switching unit of the frame by a 64 kbit/s bidirectional multiplex transmission link in a similar manner to the connection between each of the first multiplexer and demultiplexer unit and the digital switching unit. The octets of a point-to-point communication are directly transferred from the second rate incoming component link to the correspondent second rate outgoing component link in the frame. The octets of a multipoint communication pass through the digital switching unit once and are transmitted through the associated second rate bidirectional link to the multipoint unit which recopies them in several identical octets which again pass through the digital switching unit and are dispatched to the divers appropriate second rate outgoing component links connected to the multipoint communication transceivers.

The frame according to the French Pat. No. 2,346,915 or, more specifically, the digital switching unit of the frame, may be of a first type disclosed in U.S. Pat. No. 3,952,162, issued Apr. 20, 1976, or of a second type disclosed in U.S. patent application Ser. No. 884,360, filed on Mar. 7, 1978 in the name of Claude A. MOLLERON and Germain G. BROUARD. The essential difference between these two types of digital switching unit results in the fact that the address of the octet or, more specifically, the second part of the octet address—as defined hereinafter—designates the number of the low rate channels or links out of 80 in the second order link frame in accordance with the first type, whereas in accordance with the second type it is determined by the channel number out of the five low rate channels of a second rate frame which may be transmitted solely a low rate channel having the higher low rate of 12.8 kbit/s and by the position number of the octet in this low rate channel.

Taking, for example, the digital switching unit of the first type above, this multiplexes 256 second rate links into eight 2.048 Mbit/s parallel internal multiplex junctions on which the octets are conveyed in parallel.

The octets of the low rate component links each comprises a framing bit. These framing bits form a pseudo-random sequence used to calculate the addresses of the octets in the 64 kbit/s frame in such a way that the digital switching unit effects the first transfer of the multipoint communication octets towards the associated multipoint junction unit. During the octet exchange phase in the multipoint unit which transmits the incoming octets to the digital switching unit, the multipoint unit writes a further pseudo-random sequence into the framing bit location of the incoming octets in order to enable the first multiplexer and demultiplexer units to time-division demultiplex correctly the low rate outgoing digital channels which are transmitted from the digital switching unit.

Thus, according to the French Patent Application No. 2,346,915, each multipoint unit decodes the addresses transmitted by the framing bits in order to effect the appropriate switching operations, i.e. to identify the low first rate octets belonging to each multipoint communication. Furthermore, each first rate octet includes, as is known, a status bit used to identify whether, in this case particularly, a secondary data transceiver is in the transmission phase or not or, more specifically, to identify which secondary data transceiver of a multipoint communication is in communication with the associated main data transceiver. Addressing and identification have the drawback of entailing the complex logical structure of the multipoint junction unit but, more important, generate a relatively lenthy transfer time for each octet.

It will be noted that since the bidirectional digital links are connected to a multipoint junction unit operating at a second rate of 64 kbit/s and the largest common divisor of the octet numbers 5, 10, 20 and 80 of the first rate component links in the 64 kbit/s 80-octet frame is equal to five, a main data octet is only associated with a maximum secondary data number which is equal to four for a multipoint communication accomplished through the multipoint junction unit. This condition limits the possible number of secondary transceivers for each multipoint communication to a low specific value. Consequently, the multipoint digital data transmission system does not offer the requisite operational flexibility needed to adapt the number of accesses to each multipoint junction unit to the actual number of transceivers connected to it.

OBJECT OF THE INVENTION

The principal object of the present invention is to provide a multipoint digital data transmission system in which third rate multiplex links are obtained from time-division multiplexing of the second rate links and are connected to the multipoint junction units of the frame, in order that multipoint communications are established with a greater number of secondary data transceivers than 4 and with a data transfer time in each multipoint junction unit which is very small.

SUMMARY OF THE INVENTION

According to the invention, there is provided a multipoint communication digital transmission system in which the main data trensceiver of each multipoint communication can communicate with a plurality of secondary transceivers of said multipoint communication and said secondary data transceivers can each, in turn, communicate with said main data transceiver, said digital data transmission system comprising:

first means for multiplexing incoming digital links having a first rate into incoming digital links having a second rate, said first rate incoming links transmitting input component digital words which have first rates different from but multiples of one another, and which are transmitted by said main and secondary data traiceivers, the transmission periodicities of said input component digital words in each first rate link being equal to the respective ratio of said second rate to said first rate, and bits which have a predetermined position in said input component digital words of a second rate incoming link frame, forming a pseudo-random framing sequence for addressing the incoming first rate digital links;

second means for multiplexing a plurality of groups of said second rate digital links into incoming digital links having a third rate;

third means for multiplexing said third rate incoming digital links into an incoming highway having a fourth rate;

means for selectively switching said input component words from said fourth rate incoming highway to output word positions in an outgoing highway having said fourth rate in accordance with the incoming first rate digital link addresses, the component word allocated to each main data transceiver in the third rate outgoing multiframe before transferring in a multipoint junction unit and in the third rate incoming multiframe after transferring in a multipoint junction unit having a predetermined word position which is followed by the word positions allocated to the secondary data transceivers of the same multipoint communication;

first means for demultiplexing said fourth rate outgoing highway into outgoing digital links having said third rate;

second means for demultiplexing each of said third rate outgoing digital links into a group of outgoing digital links having said second rate, each second multiplexing and demultiplexing means associated with a group of second rate incoming and outgoing links including means for producing first addressing signals corresponding to said predetermined main data transceiver word positions in the third rate incoming and outgoing multiframe after and before said transferring, respectively;

third means for demultiplexing each of said second rate outgoing digital links into outgoing digital links having said first rate and transmitting output component words to be received by said main and secondary data transceivers;

a plurality of groups of multipoint junction units, each multipoint junction unit belonging to a group being interconnected to the pair of third rate incoming and outgoing digital links associated with said group, said multipoint junction unit comprising means for simultaneously transferring the input words assigned to the main data transceiver of each of said multipoint communications and corresponding to said predetermined position of said third rate outgoing multiframe on said third rate outgoing digital link of said group to output word positions assigned to the secondary data transceiver of said multipoint communication and being successive to said predetermined position of said third rate incoming multiframe on said third rate incoming digital link and means for sequentially transferring the input words assigned to the secondary data transceivers of said multipoint communication which communicates with said main data transceiver on said third rate outgoing digital link of said group to output word positions assigned to said main transceiver and corresponding to said predetermined position of said third rate incoming multiframe on said third rate incoming digital link.

It is an advantage of this invention that since the time slots allocated to the main data in said third rate incoming and outgoing multiframes have clearly determined corresponding recurrent positions and each of these is followed by the time slots allotted to the secondary data of the associated multipoint communication, each multipoint junction unit receives directly the first addressing signals corresponding to said main data time slots assigned to the incoming and outgoing multiframes and a clock signal at same rate as said third rate in order to deduce and produce therefrom second addressing signals of said secondary date time slots without using the component word framing bits.

In accordance with the invention, selection of the secondary data transceiver in communication with the main data transceiver is not resolved by the detection of word status bits, as in the case according to French Pat. No. 2,346,915, but through the logical intersection of the secondary data words following a main data word of a multipoint communication, the other secondary transceivers which are not in communication with main data transceiver, all having their data bits at state one.

Each multipoint junction unit according to the invention includes a first shift register looped to itself which receives in parallel the input words allocated to said main data transceivers from said third rate outgoing link through a series-to-parallel converter in response to said first addressing signals and which transmits in series the output words allocated to said secondary data transceivers into successive output work positions to said predetermined word positions on said third rate incoming link in response to said second addressing signals, and a second shift register looped to itself which receives in series the input words allocated to said secondary data transceivers from said third rate outgoing link in response to said second addressing signals so as to deduce from the logical intersection of secondary data transceiver input words the input words allocated to said secondary data transceiver which communicates with the main data transceiver, and which transmits in parallel said input words allocated to said secondary data transceiver in communication into said predetermined output word positions on said third rate incoming link through a parallel-to-series converter in response to said first addressing signals.

In an embodiment to which reference is made hereinafter, the third rate digital links are at a rate of 1.024 Mbit/s and convey a 1280-octet multiframe which derived from the multiplexing of at most sixteen 64 kbit/s second rate digital links. It would appear that the digital data transmission system according to the invention, as compared to that of French Patent No. 2,346,915, makes it possible to establish multipoint communications between a main data transceiver and a maximum of 15 secondary data transceivers. The multipoint junction units are assigned to groups of multipoint communications having predetermined but different number N of secondary data transceivers in order to be able to connect, through the digital switching unit of the frame and according to demand, a multipoint unit having a free multipoint communication associated with a predetermined number N out of a plurality of numbers to a main transceiver and N secondary transceivers to be interconnected.

BRIEF DESCRIPTION OF THE DRAWING

The present invention will be described in detail with reference to the accompanying drawing, in which.

BRIEF DESCRIPTION OF THE PREFERRED EMBODIMENT

Figure 1:
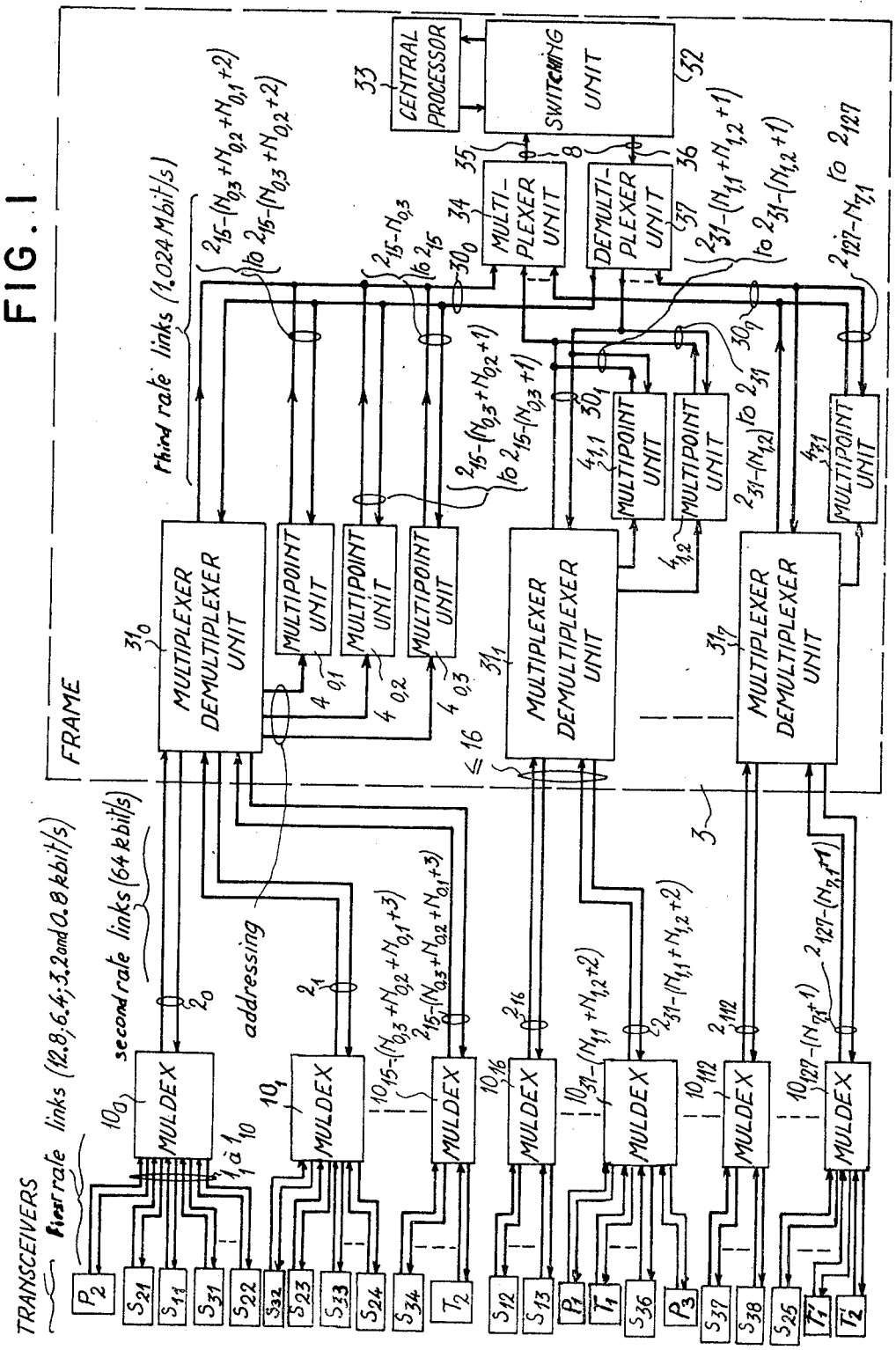
FIG. 1 is a schematic block-diagram showing the multipoint communication digital data transmissin system embodying the invention.

Referring first to FIG. 1, there can be seen that the mutlipoint communication digital data transmission system establishes multipoint communications as, for example, between the main data transceiver $P_1$ and the secondary data transceivers $S_{11}$, $S_{12}$, $S_{13}$, between the main data transceiver $P_2$ and the secondary data transceivers $S_{21}$, $S_{22}$, $S_{23}$, $S_{24}$, $S_{25}$ and between the main data transceiver $P_3$ and the secondary data transceivers $S_{31}$, $S_{32}$, $S_{34}$, $S_{35}$, $S_{27}$, $S_{38}$, and point-to-point communications between data transceivers $T_1$ and $T_1'$, $T_2$ and $T_2'$, for example. Each data transceiver transmits and receives digital input and output octet words at one of the first or low rates 12.8, 6.4, 3.2 and 0.8 kbit/s, via a first rate elementary bidirectional transmission link $1_1$, $1_2$, $1_3$, .... Each first rate digital link is connected to one of the first order mutliplexer and demultiplexer units, $10_0$ through $10_{127}$ shown in FIG. 1 and designated by the term "muldex" hereinafter. These muldexes are connected to a digital frame 3 through second or intermediate rate bidirectional digital links $2_0$ to $2_{127}$. Each second rate link may, for example, be constituted by two links of the "J3" or "J64" type, each transmitting a 64 kbit/s data signal, a second signal at a clock frequency at 64 kHz and a third signal at an octet frequency of 8 kHz. The number of the muldexes 10 and second rate links 2 which are used is in fact less than 128 in order to connect multipoint junction units to third or high rate bidirectional digital links $30_1$–$30_7$, as will be explained hereinafter.

Each muldex 10 has an appropriate number of multiplexing and demultiplexing stages which depends upon the number and rate of the first rate bidirectional links 1 to which the muldex is connected. Thus, the muldex $10_0$ has, for example, a multiplexing and demultiplexing stage which multiplexes the links $1_0$ to $1_3$ having a low first rate of 0.8 kbit/s, a multiplexing and demultiplexing stage which multiplexes the links $1_4$ to $1_6$ having a first low rate of 3.2 kbit/s and a multiplexing and demultiplexing stage which multiplexes the links $1_7$ to $1_{10}$ having a low first rate of 12.8 kbit/s.

Furthermore, each multipoint communication is effected by means of a predetermined number of muldexes 10 and by means of the frame 3. For example, the above-mentioned second multipoint communication between the main transceiver $P_2$ and secondary transceivers $S_{21}$ to $S_{25}$ is effected via the three muldexes $10_0$, $10_1$ and $10_{127-(N_{7,1}+1)}$ and the frame 3, as shown in FIG. 1.

In the digital frame 3, each group of 16 second rate incoming digital links $2_0$ to $2_{15}$, ... $2_{112}$ to $2_{127}$ are time-division multiplexed into an incoming digital link $30_0$ to $30_7$ having a third or high rate of 1.024 Mbit/s by means of a second order multiplexer and demultiplexer unit $31_0$ to $31_7$. The second rate bidirectional digital links $2_0$ to $2_{15-(N_{0,3}+N_{0,2}+N_{0,1}+3)}$ which are connected to the multiplexer and demultiplexer unit $31_0$, $2_{16}$ to $2_{31-(N_{1,1}+N_{1,2}+2)}$ which are connected to the multiplexer and demultiplexer unit $31_1$, . . . $2_{112}$ to $2_{127-(N_{7,1}+1)}$ which are connected to the multiplexer and demultiplexer unit $31_7$, are shown in FIG. 1 and are only used out of 16 second rate links for the multiplexing and demultiplexing operations in the multiplexer and demultiplexer units $31_0$, $31_1$, . . . $31_7$, respectively.

The third rate incoming digital links $30_0$ to $30_7$ are connected to a multiplexer unit 34 which multiplexes the incoming serial octets into parallel octets on a four rate incoming multiplex highway 35. Each incoming parallel octet is originated from a data transceiver. Then, the digital switching unit 32, which is connected to the highway 35, transfers and switches the incoming octets to outgoing parallel octet locations in a four rate outgoing multiplex highway 36 in accordance with the predetermined switching of the central processor 33 of the frame 3. The digital switching 32 is one of two above-mentioned types, as disclosed in the U.S. Pat. No. 3,952,162 and the U.S. patent application Ser. No. 884,360 now U.S. Pat. No. 4,168,401 issued Sept. 18, 1979. The unit 32 provides permanent connections between the first rate channels in the third rate links $30_0$ to $30_7$. These permanent connections are selected by means of the central processor and programmed by the operator in dependance on the different multipoint communications and point-to-point communications to be established. The outgoing parallel octets on the four rate outgoing highway 36 are demultiplexed into outgoing serial octets on 1.024 Mbit/s outgoing digital multiplex links by means of a demultiplexer unit 37. Thus, the switching unit 32 receives the 1.024 Mbit/s multiplex link multiframes which are originated from the multiplexing of frames of the 64 kbit/s multiplex links and transfers the octets of the first rate links associated with the data transceivers P ans S at predetermined octet locations of outgoing multiframes of the 1.024 Mbit/s outgoing multiplex links $30_0$ to $30_7$ to enable their exchange in multipoint junction units $4_0$ to $4_7$, in accordance with the program initiated by the operator. After these exchanges, the switching unit 32 inserts, as first bit in each outgoing octet, the bits of a pseudo-random framing sequence to enable them to be decoded on reception in the muldexes 10.

As shown in FIG. 1, each multiplexer and demultiplexer unit $31_i$ (i varying from 1 to 7) is connected to one or J multipoint junction units $4_{i,j}$ (j varying from 1 to J) by means of an associated third rate multiplex line $30_i$. Each multipoint junction unit $4_{i,j}$ samples a number $(N_{i,j}+1)$ or 64 kbit/s second rate channels equivalent to a multiplex link having a rate of $(N_{i,j}+1) \times \Gamma$ kbit/s. The number $N_{i,j}$ designates the maximum number of secondary transceivers S connected to a main transceiver P via the multipoint unit $4_{i,j}$. For each group of multipoint units $4_{i,j}$ which is defined by a common subscript i, the numbers $N_{i,j}$ and the number J of multipoint units connected to the third rate multiplex link $30_i$ may be modified by means of the central processor 33 and by operational adjustments, such as soldered connections, in the multipoint units, accordind to demand. The sum of numbers $(N_{i,j}+1)$ for a given multiplexer and demultiplexer unit $31_i$ is thus always less than or equal to $1024/64=16$ and, generally speaking, a number $N_{i,j}$ is in the range between 2 and 15 dependent on operational requirements.

In the example illustrated in FIG. 1, one assumes that the multiplex link $30_0$ is connected to three multipoint junctions units $4_{0,1}$, $4_{0,2}$ and $4_{0,3}$, the link $30_1$ to two multipoint junction units $4_{1,1}$ and $4_{1,2}$ and the link $30_7$ to a single multipoint junction unit $4_{0,1}$ enabling multipoint communications of a maximum of $N_{0,1}$, $N_{0,2}$ and $N_{0,3}$, $N_{1,1}$ and $N_{1,2}$ and $N_{7,1}$ secondary transceivers respectively. In this case, we obtain:

$$4 \leq N_{0,1} + N_{0,2} + N_{0,3} \leq 13$$

$$3 \leq N_{1,1} + N_{1,2} \leq 14 \text{ and}$$

$$2 \leq N_{7,1} \leq 15$$

The multiplexer and demultiplexer units $31_0$, $31_1$ and $31_7$ are connected to $(16-(N_{0,3}+N_{0,2}+N_{0,1}+3))$, $(16-(N_{1,1}+N_{1,2}+2))$ and $(16-(N_{7,1}+1))$ 64 kbit/s used digital links 2 respectively. As a general rule, a multiplexer and demultiplexer unit $31_i$ interconnected to J multipoint junction units is connected to $$(16 - (\sum_{j=1}^{j=J} N_{i,j} + J))$$

used second rate multiplex links.

The switching unit 32 transmits, via the demultiplexer unit 37 and the third rate outgoing link $30_i$, to each multipoint unit $4_{i,j}$ the serial octet groups of each multipoint communication it establishes. The data octet of a main transceiver has a location in a group of 16 second rate mutliplexed channels of the multiframe of the 1.024 Mbit/s link $30_i$ which is determined by the physical location of the multipoint unit in the junction modules which are associates with the second rate links, and which are included in the associated multiplexer and demultiplexer unit $31_i$. It is assumed in the example illustrated in FIG. 1 that the junction modules associated with the second rate multiplex link channels 2 connected to a multiplexer and demultiplexer unit $31_i$ are associated with the first channels of the group of 16 multiplexed channels in the respective third rate link $30_i$, while the later channels of this 16-channel group are associated with the respective multipoint units.

Thus out of the $16 \times 80 = 1280$ time slots in a multiframe of a 1.024 Mbit/s link $30_i$, each group of $(N_{i,j}+1)$ consecutive octets represents a mutlipoint communication and is inserted in series in $(N_{i,j}+1)$ recurrent time slots. Each of the channels of a $(N_{i,j}+1) \times 64$ kbit/s multiplex sampled by a mutlipoint unit $4_{i,j}$ is always associated with the data transmission which is originated either from a main transceiver P or from a secondary transceivers of the same word position 1 to $N_{i,j}+1$. In this case, contrary to the multipoint unit disclosed in French Patent Application No. 2,346,915, where it is necessary to decode the second octet address parts of the main and secondary transceivers coded according to pseudo-random framing bit sequences, each multipoint unit 4 according to this invention does not comprise an address calculator but merely receives two signals for the addressing of the main transceiver octets in the incoming and outgoing 1.024 Mbit/s multiframes.

Figure 2:
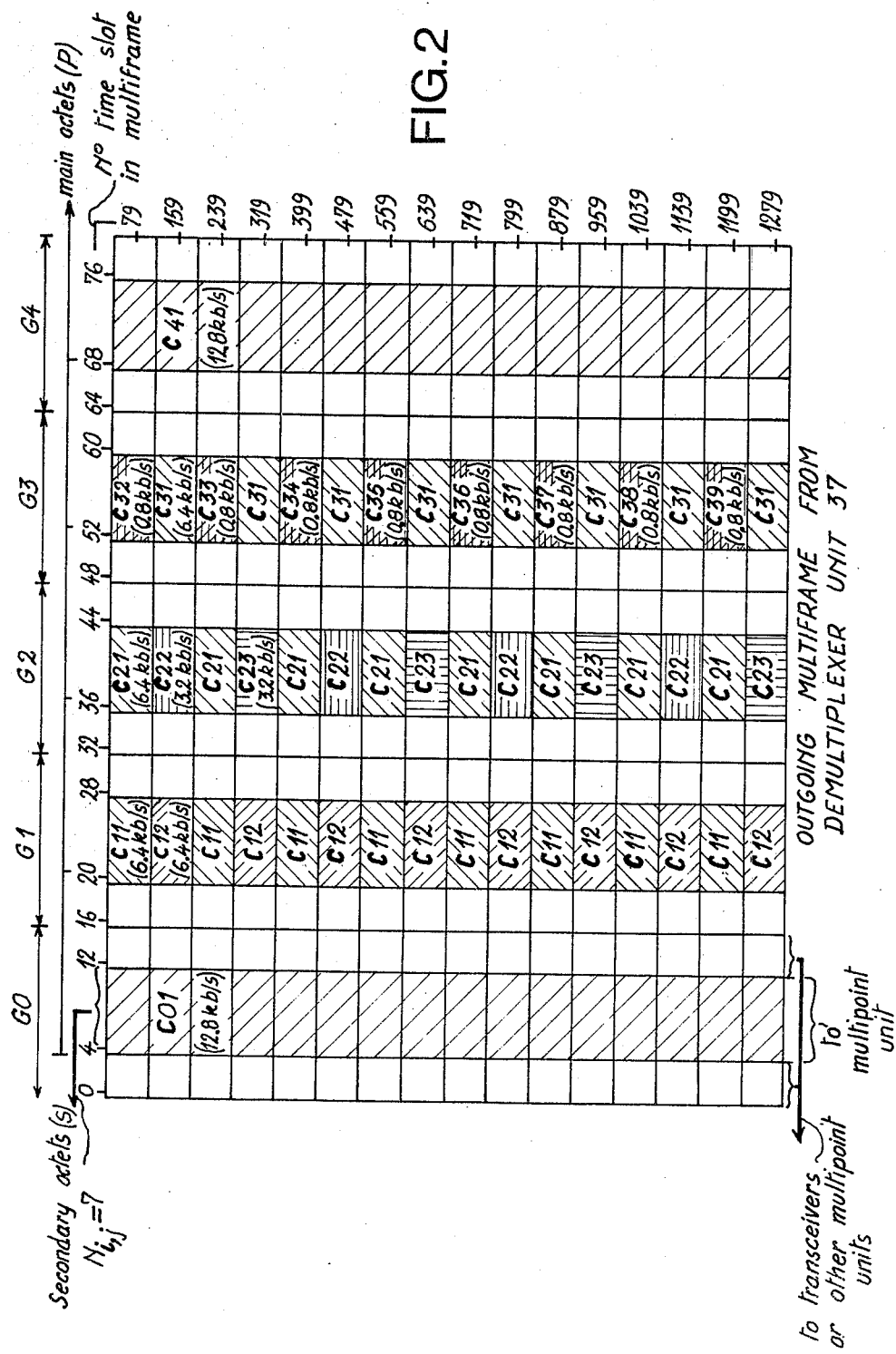
FIG. 2 is a table showing an example of the multiframe of a third rate multiplex digital link which is transmitted from the digital switching unit of the frame.

FIG. 2 shows the 1.024 Mbit/s outgoing multiframe which is transmitted from the digital switching unit 32 on a third rate outgoing link $30_i$ through the demultiplexer unit 37. The word positions of the hachured time slots are those of the data octets transmitted to an associated multipoint unit $4_{i,j}$ and associated with the main and secondary transceivers of multipoint communications. In this table, the time slots of the five 64 kbit/s frames each corresponds to a frame (or group) which is similar to that defined in the aforementioned French Pat. No. 2,346,915. The outgoing multiframe has been broken down into five groups G0 G4 which are arranged in columns and each comprises 16 sub-groups each of which comprises 16 time slots.

Each sub-group of 16 time slots is associated with the 16 third rate multiplex links 2 associated with the same multiplexer and demultiplexer unit $31_i$. It is assumed that the predetermined position of the time slot associated with the main data octets (P) is at word position 4 of each sub-group, i.e. at time slots No. 4, 20, 36, . . . 1268 of the outgoing multiframe, and that the time slots associated with the secondary data octets(S) which immediately follows each main time slot(P), are of number $N_{i,j}=7$. The other time slots, which are not hachured in FIG. 2, are allocated to the multipoint and point-to-point communication data octets which are transmitted to the transceivers and, in certain cases, to the other associated multipoint junction units $4_{i,j}$ as previously stated.

It is also assumed that groups G0 and G4 are each associated with a 12.8 kbit/s multipoint communications $C_{01}$, $C_{41}$, the group G1 with two 6.4 kbit/s multipoint communications $C_{11}$ and $C_{12}$, the group G2 with a 6.4 kbit/s multipoint communication $C_{21}$ and two 3.2 kbit/s multipoint communications and that the group G3 is associated with a 6.4 kbit/s multipoint communication $C_{31}$ and eight 0.8 kbit/s multipoint communications $C_{32}$ to $C_{39}$. Thus, in a 1.024 Mbit/s multiplex link $30_i$, the octets belonging to links at 12.8, 6.4, 3.2 and 0.8 kbit/s first rates are repeated every 80th octet (16 octets per multiframe), every 160th octet (8 octets per multiframe), every 320th octet (4 octets per multiframe) and every 1280th octet (one octet per multiframe) respectively. It will be noted that FIG. 2 does not explicitly show the secondary data octets of each sub-group, but it will be readily understood from the foregoing that the number of secondary octets of the sub-groups assigned to a multipoint communication is always at most equal to 15 and may differ from the number of sub-groups assigned to a multipoint communication included in the same or another group.

It will be noted that, contrary to the 64 kbit/s multiframe structure described in French Pat. No. 2,346,915, a 1.024 Mbit/s multiframe enables multipoint communications with a number of secondary transceivers notably more than 4, i.e. adjustable between 2 and 15, but also a number of multipoint communications at a predetermined rate higher than the maximum rate achievable in the prior art. Thus, a multipoint junction unit according to the prior art was only capable of effecting one multipoint communication at 12.8 kbit/s or two at 6.4 kbit/s or four at 3.2 kbit/s, . . . , whereas a multipoint junction unit according to the invention effects simultaneously five multipoint communications at 12.8 kbit/s or ten at 6.4 kbit/s or twenty at 3.2 kbit/s, . . . with a greater number of secondary transceivers. Thus, the multipoint digital data transmission system embodying the invention is better suited to the various alternative requirements of multipoint communications inasmuch as it has far greater operational flexibility due to the fact that a large variable number of secondary transceivers may be connected to a main transceiver with a faster transmit time through the multipoint unit and the digital switching unit than in the prior art system.

The drawing does not show the structure of the 1.024 Mbit/s incoming multiframe which is received into the switching unit 32, via the multiplexer unit 34 after the exchanges have been effected between main and secondary data octets in the multipoint unit or the multipoint units. These exchanges are performed in a similar manner to those described in the aforementioned French Pat. No. 2,346,915 for each group of $(N_{i,j}+1)$ octets. The main data octet of the outgoing multiframe which is associated with a multipoint communication, is recopied and transferred to all the time slots allocated to the incoming multiframe secondary data octets, and one of the secondary data octets corresponding to the transmitting secondary transceiver, i.e. the only one not having all its status bits equal to "1", is recopied and transferred to the time slot allocated to the incoming multiframe main data octet.

Figure 3:
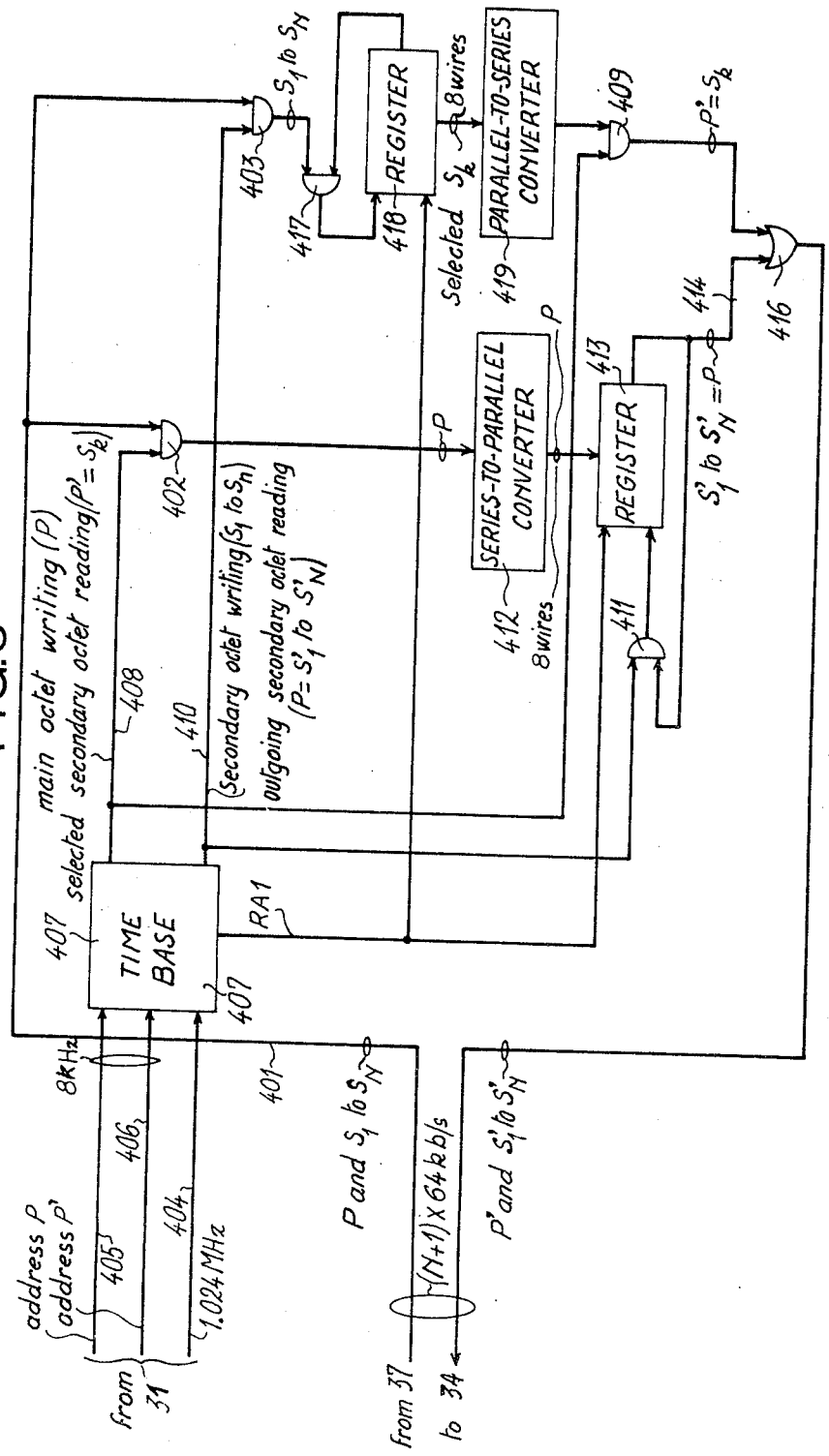
FIG. 3 is a detailed block-diagram of a multipoint junction unit embodying the invention.

Referring now to FIG. 3, a multipoint junction unit 4 according to the invention inputs the multiplex at $(N+1)\times 64$ kbit/s rate of the associated third rate line 30 on wire 401. The serial octets of the $(N+1)\times 64$ kbit/s multiplex, i.e. the main data octet P and the N secondary octets $S_1$ to $S_N$ of a multipoint communication included in each group of 16 time slots are transferred to two AND gates 402 and 403.

As already stated, each multipoint junction unit is associated with a number N corresponding to the maximum secondary transceiver number of each multipoint communication it effects, in order to obviate the presence of digital channels lacking data when operating the multipoint digital data transmission system. With this in view, the operator, dependent on demand, will assign a multipoint communication of secondary transceiver number N whenever a multipoint junction unit effecting such a multipoint communication and operating at the appropriate rate for the considered communication is available.

Furthermore, as already stated, when a secondary data transceiver does not in communication with the associated main data transceiver, all the bits of octets it transmits are at state "1". This operating condition has the advantage that by means of a shift register looped to itself it is possible to achieve the logical intersection of the secondary data contained in octets $S_1$ to $S_N$ of the secondary transceivers for each multipoint communication, i.e. the octets of the selected secondary transceiver $S_k$ (with $1 \leq k \leq N$) which is in communication with the associated main tranceiver, without making use of the states of the status bits. Additionally, the octet framing bits are not used to derive the octet addresses, since each main data transceiver octet is always allocated to the same time slot of the 1.024 Mbit/s outgoing multiframe, i.e. to a predetermined time slot belonging to the 16-time slot sub-group which corresponds to the sixteen 64 kbit/s second rate links 2 connected to the associated second order multiplexer and demultiplexer unit 31.

Consequently, each multipoint junction unit receives from the associated second order multiplexer and demultiplexer unit 31 a 1.024 Mbit/s clock signal on a wire 404 and two addressing signals on wires 405 and 406 which transmits the main data octet addresses at the recurrent frequency of 1.024/1280=8 kHz. These two latter signals correspond to the writing-in and read-out of the data from the main data time slots 4, 20, 36, 52 . . . of the 1.024 Mbit/s incoming and outgoing multiframes, in accordance with the example illustrated in FIG. 2. These two addressing signals are received by a time base 407 which is synhcronized at the clock frequency of 1.024 MHz. The time base 407 transmits on a wire 408 the recurrent addressing signal of main data time slots 4, 20, 36, 52 . . . to two AND gates 402 and 409 and transmits on a wire 410 the recurrent addressing signals of N secondary data time slots (N=7): 5 to $5+N-1$, 21 to $21+N-1$, 37 to $37+N-1$, 53 to $53+N-1$, . . . to two AND gates 403 and 411.

The main data transceiver octets P are received from the third rate outgoing link 30 and are detected and writed through the AND gate 402 in a series-to-parallel converter 412. This converter 412 is analogous to a buffer register and converts each serial main data octet into parallel octet on a 8-wire output bus. A shift register 413 receives the parallel main data octet and is looped to itself through th AND gate 411 which receives the reading-out signal on wire 410. Consequently, throughout the transmission duration of a subgroup of N successive time slots allocated to secondary data octets $S_1$ to $S_N$, a main data octet of multipoint communication is inserted from the register 413 into the secondary data time slots $S_1'$ to $S_N'$ of the incoming multiframe (P', S') and is transmitted, via the wire 414 and a OR-gate 416, on the incoming third rate link 30 transmitting the $(N+1)\times 64$ kbit/s multiplex.

During successive time intervals of the time slots assigned to secondary data, the serial secondary data octets $S_1$ to $S_N$ of the outgoing multiframe (P,S) are writed in a shift register 418, through the AND-gates 403 and 417. The register 418 is looped to itself via the AND-gate 417. The AND-gate 403 receives on the wire 410 the addressing signal which controls the writing-in of the secondary data octets. The stages of shift register 413 and 418 are reset to state "1" under the control of the signal RA1 which is transmitted from the time base 407. This resetting is controlled before any transmission of a group of secondary data octets $S_1$ to $S_N$, i.e. before the transmission of the main data time slot addressing signal on the wire 408, for example. Thus, the logical intersection of the secondary data octets of a multipoint communication is memorized in the shift register 418 at the transmission end of secondary time slot addressing signal on wire 410. This logical intersection is equal to the data octet $S_k$ allocated to the selected secondary transceiver which is in communication with the main transceiver of the multipoint communication.

The selected secondary data octet $S_k$ is transmitted in parallel from the shift register 418, via a 8-wire output bus, to a parallel-to-series converter 419. This converter 419 is analogous to a buffer register and converts the parallel octet $S_k$ in a serial octet. The output of the converter 419 is connected to the input of the AND-gate 409, the other input of which receives the selected secondary transceiver octet reading-out signal on wire 408. Thus, the selected secondary octet is read-out and transmitted through the AND-gates 409 and the OR-gate 416 in the associated third rate incoming link 30 which transmits, inter alia, the $(N+1)\times 64$ kbit/s multiplex included in the incoming multiframe (P',S'). In this incoming multiframe (P',S'), the octets $S_k$ of the selected secondary data transceivers have been recopied in the time slots allocated to the corresponding main octets (P'), always assuming that the secondary data transceivers of a multipoint communication only transmit one at a time and the main data transceiver octets P have been recopied in the time slots allocated to the respective secondary octet groups $S_1'$ to $S_N'$ of the multipoint communication.

Although the invention has been described with reference to embodiment, it is expressly stipulated that its scope is limited solely by the claims given hereinafter. More particularly, the bit number of characters or words, such as octets, and the rates of the various multiplex links are not restricted to the numerical values quoted.

What we claim is:

1. A digital data transmission system providing multipoint communications in which the main data transceivers of each multipoint communication can communicate with a plurality of secondary transceivers of said multipoint communication and said secondary data transceivers can each, in turn, communicate with said main data transceiver, said digital data transmission system comprising:

first means for multiplexing incoming digital links having a first rate into incoming digital links having a second rate, said first rate incoming links transmitting input component digital words which have first rates different from but multiples of one another and which are transmitted by said main and secondary data transceivers, the transmission periodicities of said input component digital words in each first rate link being equal to the respective ratio of said second rate to said first rate, and bits which have a predetermined position in said input component digital words of a second rate incoming link frame, forming a pseudo-random framing sequence for addressing the incoming first rate digital links;

second means for multiplexing a plurality of groups of said second rate digital links into incoming digital links having a third rate;

third means for multiplexing said third rate incoming digital links into an incoming highway having a fourth rate;

means for selectively switching said input component words from said fourth rate incoming highway to output word positions in an outgoing highway having said fourth rate in accordance with the incoming first rate digital link addresses, the component word allocated to each main data transceiver in the third rate outgoing multiframe before transferring in a multipoint junction unit and in the third rate incoming multiframe after transferring in a multipoint junction unit having a predetermined word position which is followed by the word positions allocated to the secondary data transceivers of the same multipoint communication;

first means for demultiplexing said fourth rate outgoing highway into outgoing digital links having said third rate;

second means for demultiplexing each of said third rate outgoing digital links into a group of outgoing digital links having said second rate, each second multiplexing and demultiplexing means associated with a group of second rate incoming and outgoing links including means for producing first addressing signals corresponding to said predetermined main data transceiver word positions in the third rate incoming and outgoing multiframes after and before said transferring, respectively;

third means for demultiplexing each of said second rate outgoing digital links into outgoing digital links having said first rate and transmitting output component words to be received by said main and secondary data transceivers;

a plurality of groups of multipoint junction units, each multipoint junction unit belonging to a group being interconnected to the pair of third rate incoming and outgoing digital links associated with said group, said multipoint junction unit comprising means for simultaneously transferring the input words assigned to the main data transceiver of each of said multipoint communications and corresponding to said predetermined position of said third rate outgoing multiframe on said third rate outgoing digital link of said group to output word positions assigned to the secondary data transceiver of said multipoint communication and being successive to said predetermined position of said third rate incoming multiframe on said third rate incoming digital link and means for sequentially transferring the input words assigned to the secondary data transceivers of said multipoint communication which communicates with said main date transceiver on said third rate outgoing digital link of said group to output word positions assigned to said main transceiver and corresponding to said predetermined position of said third rate incoming multiframe on said third rate incoming digital link.

2. A digital data transmission system providing multipoint communications according to claim 1 in which each multipoint junction unit of a group includes means receiving a clock signal having the frequency of said third rate, and said first addressing signals from said second multiplexing and demultiplexing means associated with said group for producing second addressing signals corresponding to said input and output word positions assigned to said secondary data transceiver in said outgoing and incoming third rate multiframes.

3. A digital data transmission system providing multipoint communications according to claim 2, in which the input component words allocated to secondary data transceivers of a multipoint communication which do not communicate with said main transceiver of said multipoint communication, have all the bits at state one.

4. A digital data transmission system providing multipoint communications according to claim 3, in which each multipoint junction unit includes a first shift register looped to itself which receives in parallel the input words allocated to said main data transceiver from said third rate outgoing link through a series-to-parallel converter in response to said first addressing signals and which transmits in series the output words allocated to said secondary data transceivers into successive output word positions to said predetermined word positions on said third rate incoming link in response to said second addressing signals, and a second shift register looped to itself which receives in series the input words allocated to said secondary data transceivers from said third rate outgoing link in response to said second addressing signals so as to deduce from the logical intersection of secondary data transceiver input words the input words allocated to said secondary data transceiver which communicates with the main data transceiver, and which transmits in parallel said input words allocated to said secondary data transceiver in communication into said predetermined output word positions on said third rate incoming link through a parallel-to-series converter in response to said first addressing signals.

5. A digital data transmission system providing multipoint communication according to claim 1, in which the multipoint communication undergoing said transferring in the same multipoint junction unit have secondary data transceiver numbers which are different and in which said switching means includes connection means for associating each multipoint communication having a predetermined secondary data transceiver number with a multipoint junction which establishes said transferring of data words associated with multipoint communications having said predetermined secondary data transceiver number.

6. A digital data transmission system providing multipoint communication according to claim 1 in which the number of secondary data transceivers associated with a multipoint communication is less than or equal to fifteen.

* * * * *